United States Patent [19]

Dilling et al.

[11] 4,001,202
[45] Jan. 4, 1977

[54] PROCESS FOR MAKING SULFONATED LIGNIN SURFACTANTS

[75] Inventors: Peter Dilling; Gerald Prazak, both of Charleston, S.C.

[73] Assignee: Westvaco Corporation, New York, N.Y.

[22] Filed: Oct. 17, 1975

[21] Appl. No.: 623,441

[52] U.S. Cl. .............................. 260/124 R; 8/34; 8/173; 8/83; 260/124 A
[51] Int. Cl.$^2$ ......................................... C07G 1/00
[58] Field of Search ......... 260/124 A, 124 R; 8/34, 8/83, 173

[56] References Cited

UNITED STATES PATENTS

| | | | |
|---|---|---|---|
| 3,763,139 | 10/1973 | Falkehag | 260/124 R |
| 3,865,803 | 2/1975 | Falkehag | 260/124 A |
| 3,905,926 | 9/1975 | D'Alelio | 260/124 A |

Primary Examiner—Lewis Gotts
Assistant Examiner—D. R. Phillips
Attorney, Agent, or Firm—Richard L. Schmalz; Ernest B. Lipscomb, III

[57] ABSTRACT

Disclosed herein is an improved process for producing sulfonated lignin surfactants for use as dispersants for disperse dyes and vat dyes. The improved process is to react a sulfonated lignin and epihalohydrin under certain conditions to block a portion of the free-phenolic hydroxyl group and at the same time cross-link the lignin molecules to increase the molecular weight. Another aspect of the process of this invention is to oxidize the thus treated lignin to stabilize its properties. Dispersants made according to this process have improved fiber staining and heat stability properties over other lignin-based dispersants.

7 Claims, 6 Drawing Figures

FIG.4
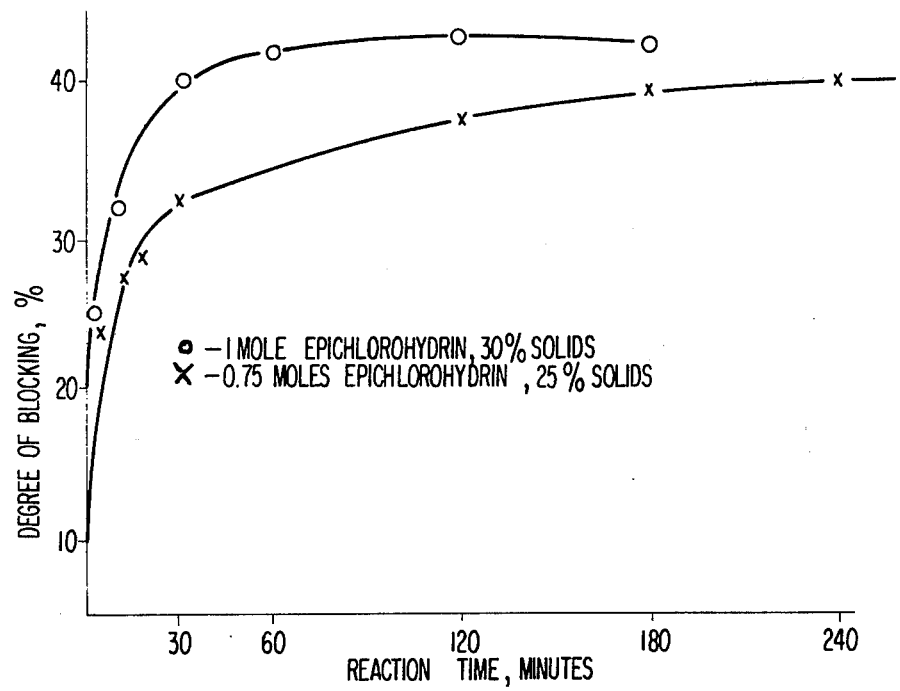
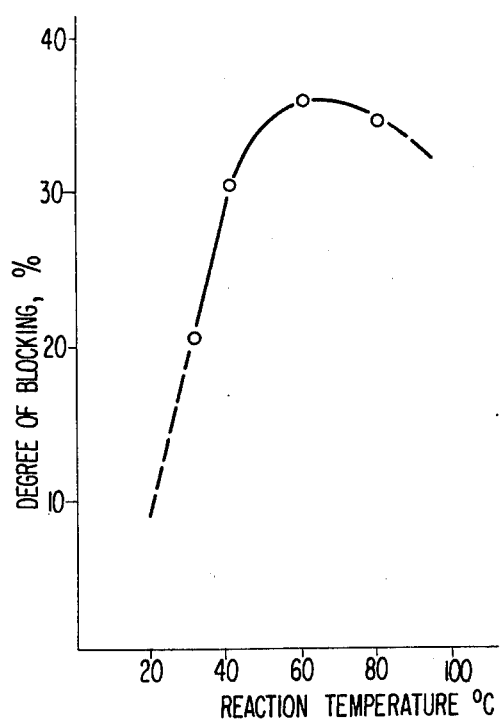
FIG.5
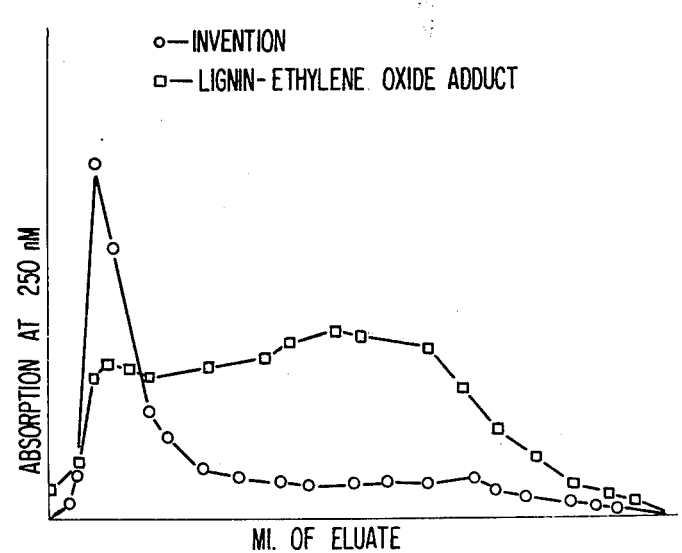
FIG.6

PROCESS FOR MAKING SULFONATED LIGNIN SURFACTANTS

BACKGROUND OF THE INVENTION

1. Field of the Invention

This invention relates to an improved process for making sulfonated lignin surfactants and their use as dispersants for dyestuff. More particularly, this invention relates to improving the fiber staining properties of a sulfonated lignin dye dispersant by controlling the amount of free-phenolic hydroxyl groups and the molecular weight.

Dyestuff compositions comprise, for the most part, a dye cake, i.e., disperse dyes and vat dyes, and a dispersant. These dyestuff compositions are widely used to color both natural and synthetic fibers. In the dyestuff composition, the dispersant serves three basic functions. It assists in reducing the dye particle to a fine size; it maintains a dispersing medium; and it is used as an inexpensive diluent. Generally, however, the dye dispersants are of two major types, sulfonated lignins from the wood pulping industry and naphthalene sulfonates from the petroleum industry.

2. The Prior Art

Unique characteristics of sulfonated lignins as dispersants are identified with their good compatibility to many dye systems, their outstanding dispersant characteristics at ambient and elevated temperatures and their availability. By no means are sulfonated lignins perfect dye dispersants. They are highly chromophoric and adsorptive in nature towards most fibers and contains reducing functions. Foaming characteristics, high pH and high ash content also add to the undesirable properties of some sulfonated lignins for use as surfactants.

A major problem associated with the use of sulfonated lignin dye dispersants is their tendency to stain the fibers, which is dependent upon the color of the dispersant, the chemical structure of the fiber and the chemical structure of the sulfonated lignin itself. Wool and nylon fibers are most susceptible to sulfonated lignin adsorption. These fibers possess a large number of amide structures capable of forming strong hydrogen bonds, especially with electron donating structures, such as acetic, phenolic and carboxylic acid groups. At acidic pH's, the various salts are beginning to be converted into their acids; and thus additional staining is seen. Sulfonated lignin absorbed to the fiber generally results in loss of brightness and in extreme cases, particularly with the lighter color shades, may cause intolerable color distortions.

A second detrimental effect caused by the action of sulfonated lignins as dispersants are their ability to reduce dyes of a di-azoid nature. Elimination of the double bond by hydrogenation will eliminate the color body of the particular dye and thus results in a colorless component. Therefore, the use of sulfonated lignins generally requires quantities of dyes greater than the theoretical requirements to compensate for potential color losses during the operation.

The same groups in lignin which permit adsorption onto the fiber are responsible for the good dispersing behavior. Blocking of these functions has for that reason resulted in products with less than desirable dispersibility, particularly at elevated temperatures. Blocking, which eliminates the most strongly reducing groups, such as phenols and catechols, has been used in eliminating or at least minimizing fiber staining and diazo dye reduction tendencies. One such method for reacting sulfonated lignin with epichlorohydrin is U.S. Pat. No. 3,672,817 to Falkehag et al. who teach an epichlorohydrin modified lignin as a dye dispersant. The process of this invention provides an improvement over the Falkehag et al. material.

Other reactants are available to modify lignins to improve certain properties, for example, dispersing ability, or to inhibit a property that is undesirable for certain uses, for instance, the undesirable dark color of lignin. By way of illustration of methods of modifying lignins, the following patents are cited. U.S. Pat. No. 3,600,308 to G. G. Allen describes reacting lignin with a variety of chemical agents to increase molecular weight for use as coagulants. U.S. Pat. No. 3,546,199 to D. T. Christian et al. describes a process for producing polyols from lignin. U.S. Pat. No. 2,854,444 to L. T. Monson et al. describes a process for oxyalkylating lignin sulfonic acid for use as wetting agents and dispersants. Additional examples of reacting or modifying lignin to make them more suitable as dye dispersants include U.S. Pat. No. 3,156,520 to L. A. Baisdell; U.S. Pat. No. 3,094,515 to K. F. Keirstead et al.; U.S. Pat. No. 3,726,850 to Detroit; U.S. Pat. No. 2,680,113 to E. Adler et al.; and U.S. Pat. No. 3,769,272 to Hintz. The art cited is meant to show the state of the art and is not intended to be all inclusive of lignin modifications.

Although the methods for treating sulfonated lignins described above offer some advantage during dyeing, none have produced a product possessing the improvements obtained by the products made according to the claimed process.

Thus, it is the general object of this invention to provide a process whereby sulfonated lignins or lignosulfonates may be treated to improve their usefulness as dye dispersants.

Another object of this invention is to provide a process whereby an epihalohydrin is used to both block a portion of the free-phenolic hydroxyl groups of the lignin and to sufficiently cross-link lignin molecules to increase molecular weight thereby providing a more heat stable dispersant while still leaving enough phenolic hydroxyl groups to interact with the dye particle.

Other objects, features and advantages of this invention will be seen in the following detailed description of the invention taken in conjunction with the accompanying drawings.

SUMMARY OF THE INVENTION

It has been found that fiber staining may be virtually eliminated if a proper balance of free-phenolic hydroxyl groups are blocked and lignin molecules are cross-linked. Thus, the process of this invention comprises reacting a sulfonated alkali lignin or lignosulfonate in an aqueous solution, preferably at a solids concentration between 5% and 35% by weight of lignin, with from 0.1 mole to 2.0 moles of an epihalohydrin at a pH between 9 and 13 at a temperature between 20° C. and 100° C. for from 5 minutes to 240 minutes to block a portion of the free-phenolic hydroxyls usually about 30% to 55%, and at the same time increase the molecular weight by cross-linking. It should be noted, as is clear from the drawings, that just a little reaction with epichlorohydrin at the proper conditions shows significant blocking. Even small degrees of blocking give improved fiber staining properties. An additional aspect of the process of this invention is that the epihalohydrin-treated lignin may be further improved by oxidizing.

BRIEF DESCRIPTION OF THE DRAWINGS

FIG. 4 shows the effect of reaction time on degree of blocking of free-phenolic hydroxyl groups in the lignin.

FIG. 5 shows the effect of reaction temperature on degree of blocking of free-phenolic hydroxyl groups in the lignin.

FIG. 6 shows the molecular weight distribution of an epichlorohydrin blocked lignin made according to the process of this invention compared to a commercially available ethylene oxide lignin adduct dye dispersant made according to the teachings of U.S. Pat. No. 3,672,817.

DETAILED DESCRIPTION OF THE INVENTION

Figure 1:
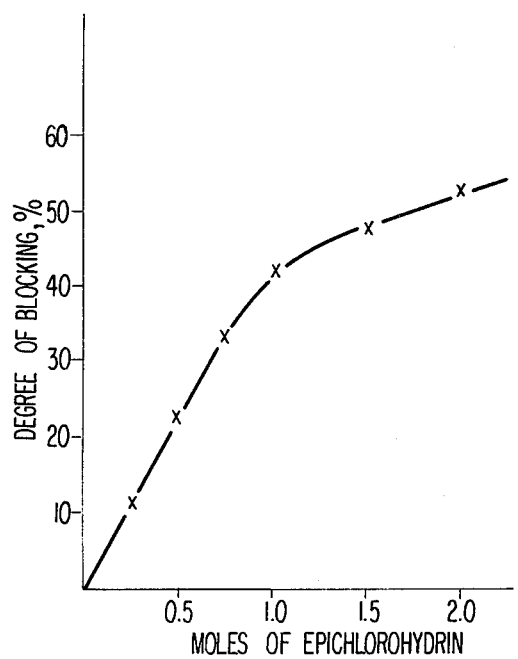
FIG. 1 is a graph showing the degree of blocking of a sulfonated lignin vs. the amount of epichlorohydrin reacted.

Like so many chemicals whose uses affect a number of properties during their use, dye dispersants are also subjected to these problems. For instance, when fiber staining is improved, another property may be adversely affected. Thus, the improved process must account for balancing of conditions.

Under a set of conditions, the following parameters must be considered.

1. lignin concentration
2. reaction pH
3. reaction temperature
4. degree of blocking
5. molecular weight
6. viscosity These parameters interact to influence the properties during dyeing; and the net results are measured in the amount of fiber staining, heat stability and the like.

Raw Materials: Lignin is obtained from spent pulping liquors, known as black liquor, of the pulp industry where lignocellulosic materials, such as wood, straw, corn stalks, bagasse, and the like, are processed to separate the cellulose or pulp from the lignin. For example, the alkali lignin obtained from the kraft, soda and other alkaline processes is not recovered as a sulfonated product but may easily be sulfonated by reacting the product with a bisulfite or sulfite. In the sulfite pulping process, the lignocellulosic material is digested with a bisulfite or sulfite to obtain a sulfonated residual pulping liquor wherein the sulfonated lignin is dissolved. Likewise, lignin known as "hydrolysis lignin" obtained from the hydrolysis of lignocellulosic materials in manufacturing wood sugars, or "hydrotropic lignins" derived from hydrotropic pulping processes may be sulfonated and used.

By the term "sulfonated lignin," it is meant any lignin containing at least an effective amount of sulfonate groups to solubilize the lignin in water at neutral or acid conditions. Any of the sulfonated lignins may contain up to one-half of the other materials, such as carbohydrates, phenols and other organic and inorganic compounds. The presence of these other materials results in larger consumption of the reactants used to form the adduct; therefore, some purification of the lignin starting materials is often desirable. Since the chemical structure of lignin varies according to its source and treatment, the term "sulfonated lignin" will be used herein to represent both sulfonated alkali lignin and sulfite liquor lignins from whatever source. The degree of sulfonation present in the lignin is not a controlling factor in making the adduct but does control the amount of solubility and, therefore, the degree of blocking obtainable. The term "sulfonated lignin" is also meant to include alkali lignins that have been sulfomethylated by reaction with sodium sulfite and formaldehyde. One such process is taught by E. Adler et al. in U.S. Pat. No. 2,680,113.

Reaction of epihalohydrin, with epichlorohydrin being preferred, with sulfonated lignins results in lignin adducts with virtually no adsorption to nylon at dyeing conditions of pH 7 and above and significantly reduces staining properties at acidic pH's. This can be attributed to a reduction of phenolic and catecholic-type functionality. These catecholic structures are also considered to be responsible for severe azo dye fading during pressure dyeing which generally is applied in dispersed or vat dye systems.

The reaction of a sulfonated lignin and an epihalohydrin, illustrated by epichlorohydrin, within the claimed process limitations is believed illustrated by the following equation wherein lignin is shown as a unit containing a quaiacyl group:

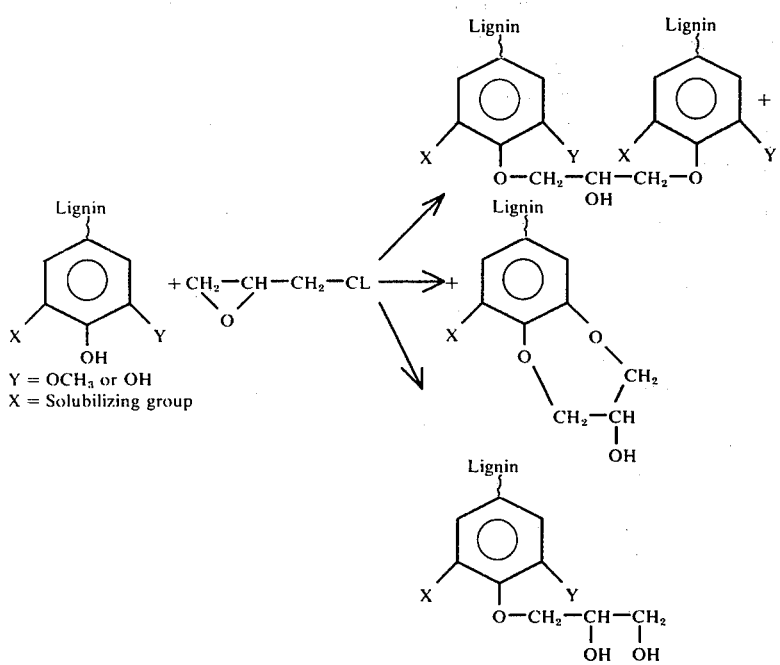

PREFERRED REACTION CONDITIONS

The following preferred reaction conditions have been found to produce the most desirable product. The limitations of the various parameters will be discussed hereinafter. At a starting pH of 10.7–11.0 and a starting solids concentration of about 30%, 0.75–1.0 mole of epichlorohydrin is reacted with a sulfonated lignin at reaction temperatures of 80° C.–90° C. Data indicate that the reaction proceedings are relatively quick within the first few minutes easing off considerably thereafter and reaching an optimum conversion level after about 3 hours. Good stirring is important to avoid epichlorohydrin localization which potentially could result in over cross-linking and subsequent particle formation.

Degree of Phenol Blocking

The degree of blocking is nearly proportional to the staining tendencies of epichlorohydrin derived lignins. The mole ratio of epichlorohydrin as based on 1,000 grams of sulfonated lignin may vary from 0.1 to 2.0 moles and has conveniently been shown in FIG. 1. FIG. 1 indicates a linear relationship between epichlorohydrin and degree of blocking which exists up to 0.75 mole corresponding at this point to a 36.5% phenol blocking. At or slightly above 0.75 mole, an inflection point is observable, and the final reaction outcome gradually decreases with increasing epichlorohydrin involvement reaching at 2 moles, a blocking value of 54%. The optimum amount of blocking will depend somewhat on the source of the lignin and the amount of solubilizing groups, i.e., degree of sulfonation. The data shown in FIG. 1 was obtained by blocking a sulfonated alkali lignin at 90° C. at a lignin concentration of 25% and a pH of 11.0 for 240 minutes.

Lignin Concentration

Figure 2:
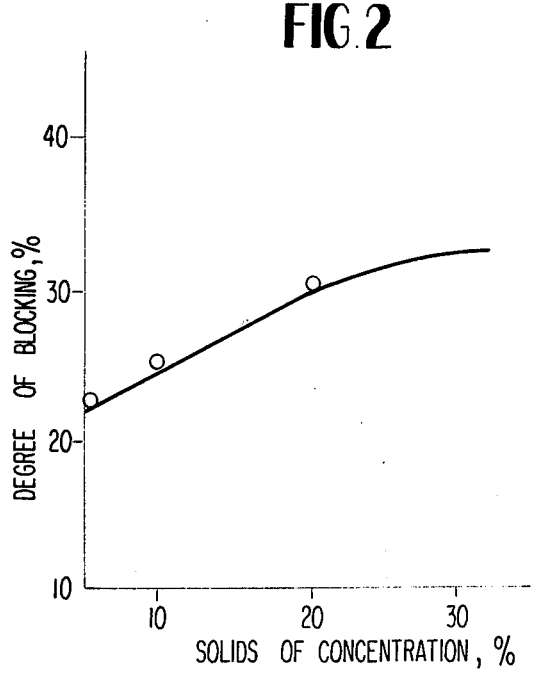
FIG. 2 shows the effect of sulfonated lignin concentration on degree of blocking of free-phenolic hydroxyl groups in the lignin.

The concentration of lignin in solution prior to addition of epichlorohydrin has a substantial effect on the properties of the resulting dispersant. The reaction is preferably conducted at a lignin solids concentration between about 5% and 35% solids, preferably 10% to 30% by weight solids. The relationship of lignin concentration and the final extent of blocking for a moderately sulfonated alkali lignin is nearly linear as shown in FIG. 2. If the solids concentration is too high, an unacceptable lignin gel is formed. From FIG. 2, it can be seen for that particular sulfonated lignin that the reaction should be carried out at the highest tolerable lignin solids content to obtain the highest degree of free-phenolic blocking. The data shown in FIG. 2 was obtained from a sulfonated alkali lignin having 1 mole of epichlorohydrin at pH 11 and at a temperature of about 90° C. for 240 minutes.

The Effect of pH on Reaction

Figure 3:
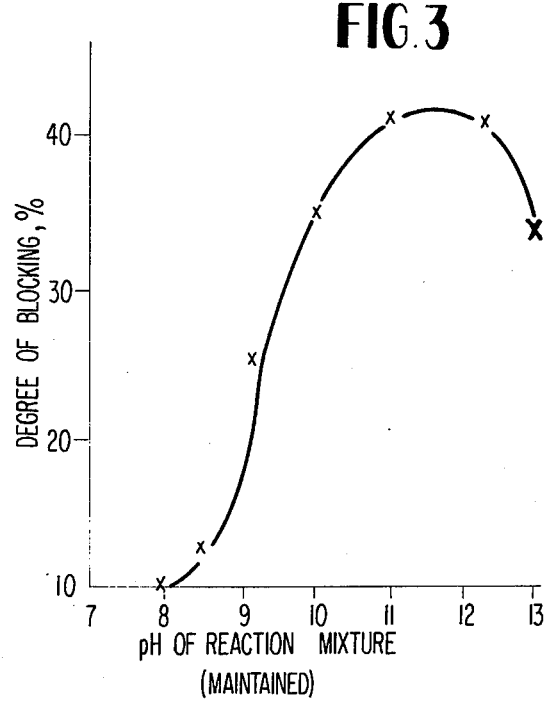
FIG. 3 shows the effect of pH during reaction on the degree of blocking of free-phenolic hydroxyl groups in the lignin.

The reaction pH in FIG. 3 may be maintained by either sodium hydroxide or sulfuric acid. From FIG. 3, the data show that appreciable blocking begins above about pH 9 and declines sharply about pH 13. The preferred range is between pH 10.5 and 12.5. It should be kept in mind, however, that the reaction optimum is dependent upon the amount of epichlorohydrin used. The results shown in FIG. 3 were obtained from a 1-mole epichlorohydrin adduct reacted at 25% by weight lignin solids at 80° C. for 240 minutes.

Reaction Time

Time reaction kinetics have been studied with regard to reaction conversion and were plotted against reaction time: and in FIG. 4, this discloses a pronounced reactivity of the epichlorohydrin within the first few minutes. Generally, at least 15 minutes are needed. Beyond 30 minutes, the reaction gradually levels off and reaches a maximum at about 2–3 hours depending upon the solids concentrations of the lignin mixture. An increase in reaction time must be allowed if, for example, the solids content is lowered from 30% to 25%. The reaction temperature was 80° C.

Reaction Temperature

The reaction of sulfonated lignins or lignosulfonates with epichlorohydrin may be carried out at a temperature between 20° C. and 100° C. However, the preferred temperature is between 50° C. and 90° C. As shown in FIG. 5, the degree of blocking of a 1-mole adduct increases with the temperature up to about 70° C. At the lower temperatures, i.e., about 20° C., sufficient blocking of the free-phenolic hydroxyl takes place.

Viscosity Control

Viscosity problems are encountered at and above 60% phenolic hydroxyl group blocking at 25% solids concentration and thus restricts the use of epichlorohydrin for extended blocking. The marginal blocking of 54% when reaction quantities of 2.0 moles were employed can be identified mainly with pH reductions occurring during the reaction proceedings (starting pH = 10.2) below the ionization point of the majority of phenolic groups.

As can be seen from Table I below, describing viscosity measurements on epichlorohydrin adduct of sulfonated lignins, no detrimental thickening behavior occurred at reaction concentrations of 30% as long as reaction quantities were kept at a lower level. Problems do arise when the epichlorohydrin ratio is increased above 1.25 moles at and above 30% solids. No problems are encountered when the reaction is carried out at reduced solids concentration (25% and below) even at epichlorohydrin levels as high as 2 moles. However, it is desirable that the final viscosity be below 500 cps. at 25° C.

TABLE I

| Moles of Epichlorohydrin | Reaction at Solids Conc. (%) | Final Viscosity (cps. at 25° C.) |
|---|---|---|
| 0.75 | 5 | 9.5 |
| 0.75 | 10 | 10.0 |
| 0.75 | 20 | 16.5 |
| 0.75 | 25 | 26.5 |
| 0.75 | 30 | 48.5 |
| 1.50 | 25 | 46.0 |
| 2.00 | 25 | 69.5 |
| 1.25 | 30 | 395 |
| 1.50 | 30 | 1590 |

Molecular Weight

It appears that the role of the molecular weight of lignin and its implication to staining and overall dyeing performances is pronounced. This observation is based on a quality comparison of ethylene oxide vs. epichlorohydrin reaction, the latter being distinguishably higher in its molecular weight distribution as determined by gel permeation chromatography (FIG. 6). Lignin to fiber adsorption in both reaction instances is almost equivalent despite a distinct difference in the degree of phenol blocking being sufficiently lower (~50%) in the case of epichlorohydrin modification (5 moles ethylene oxide vs. 2 moles epichlorohydrin). This lower degree of phenol blocking required for comparable staining to that of ethylene oxide-lignin adducts can at least in part be attributed to the heat stability and dispersion improvements.

Oxidation of Blocked and Cross-Linked Material

An additional aspect of this invention is to further treat the epichlorohydrin adducts of sulfonated lignins with oxidants chosen from the group consisting of air, oxygen and hydrogen peroxide to stabilize the adducts against viscosity increases. It is desirable in obtaining a dye dispersant with the more advantageous properties that the blocking and cross-linking be carried out prior to oxidation.

When the oxidant is hydrogen peroxide, the epichlorohydrin-lignin adducts in solution should be adjusted to pH between 7.0 and 11.0 but preferably about pH 10. The amount of hydrogen peroxide used is between 0.04 and 5.0 moles of $H_2O_2$ (100%) per 1,000 grams of blocked lignin solids. The reaction time is usually about an hour at room temperature, but in any case below about 50° C.

When the oxidant is oxygen or air, the epichlorohydrin-lignin adduct is subjected to the oxidation treatment at an oxygen or air pressure of 50 to 200 p.s.i. and at a temperature of 50° C. to 150° C. for from 5 minutes to 2 hours. The preferred oxidation parameters, however, are 100 p.s.i., 90° C. and 0.5 hour. The initial pH should be from approximately below 12.5, preferably about 11.0.

In all cases of oxidations, whether by air, oxygen or by hydrogen peroxide, a good mixing of the lignin adduct solution is essential to achieving the best results. Under certain oxidation conditions, the color of an "unblocked" lignin sample can also be reduced; but the magnitude of color reduction is limited (usually less than 30%). Furthermore, "unblocked" lignins are extremely sensitive to the variation of temperature and pH of the lignin solutions during oxidation. Again, the reason for the difference (between "blocked" and "unblocked" lignins) is that "unblocked" lignin is oxidized to chromophores or colorless products. In the case of "blocked" lignin, the formation of color bodies is prevented or minimized by blocking of phenolic groups; whereas, chromophores are still subjected to destruction by oxidants.

The dispersants made by the process of this invention are particularly useful with disperse dyes or vat dyes in either the dry or liquid form. The epihalohydrin/sulfonated lignin adduct may be added to the dye cake before, during or after grinding. It is generally preferred to add the surfactant prior to grinding so that it will be thoroughly mixed and aid in particle size reduction. The amount of epihalohydrin/sulfonated lignin dispersant added to a dye will vary widely, depending upon the particular dye cake, the material to be dyed and the effect desired. Amounts up to 75% of the sulfonated lignin dispersant, based upon the weight of dried dye cake may be used. The most important factor in determining the proper amount of lignin dispersant to be used in making up the dyestuff is the particular dye cake used. Generally, this amount will vary from dye to dye.

The lignin dispersants of this invention have for the most part eliminated the need for other additives in the dyestuff composition; but for special dyeing problems, wetting agents, defoamers, carriers or other additives may be included.

Fiber Staining

As discussed above, reduction of fiber staining is perhaps the most important advantage resulting from using the process of this invention. Staining is more pronounced at pH - 7 than at pH - 9 and much more pronounced yet at pH - 4. This is due to the number of acidic protons within the lignin matrix increasing as the pH is lowered. While at pH - 7 and above the stain is caused predominantly by phenolic-type structures, at the lower pH values when the carbonyl groups are in their acetic form, fiber staining is a combined function of phenols and carboxyls. The mechanism for staining can be identified with hydrogen bonding of these acetic groups in the lignin (carboxylic, phenolic and aliphatic hydroxyl groups) with electron rich structures of the fabric, such as $-C=O$ $-NH$ and $-OH$. The chemical nature of the fabric and the quantity of these groups present play an important role in the degree of the lignin affinity towards the fabrics and can be correlated at least qualitatively to these functions. Although wool, which displays the highest ratio of $C=O$ and $-NH$ structures per carbon atom among the most common fibers in use (nylon, polyester and wool), problems generally are less in severity since neutral or slightly alkaline pH's are being applied during the coloration process. Nylon, if dyed in acidic medium (pH 5–6), produces undesirable lignin discolorations that are probably the most problematic among the above listed fabrics.

Staining variations with different lignins, when exposed to one type of fabric, will also vary a great deal. This, of course, is due to the changing composition of the lignin, the varying degree of color body displayed, the affinity of the lignin to the fabric (number of acidic protons), the pH applied during the dyeing operation and, last but not least, the solubility nature of the lignin. In Table II, there is shown the staining tendencies of various sulfonated lignins before and after blocking according to the process of this invention. The blocking was carried out by reacting the various sulfonated lignins at 25% concentration with 0.75 mole of epichlorohydrin (except where indicated) at 95° C. for 3 hours.

TABLE II

| Type Lignin | Staining of Unblocked Mat. % Reflectance | | Starting pH | Final pH | Staining of Blocked Lignins % Reflectance | |
|---|---|---|---|---|---|---|
| | pH = 4 | pH = 7 | | | pH = 4 | pH = 7 |
| Sulfonated Alkali Lignin Moderately Sulfomethylated | 42 | 50 | 10.2 | 9.70 | 55 | 71 |
| Alkali Lignin* Highly Sulfomethylated | 53.5 | 66 | 10.2 | 9.75 | 62 | 84 |
| Alkali Lignin | 57 | 76 | 10.2 | 10.0 | 68 | 89 |
| Sulfite-Based Lignin | 38 | 48 | 10.2 | 9.0 | 53 | 71 |

Notes:
*This example was blocked with 0.5 mole epichlorohydrin.

The following test procedures were used to determine the improved usefulness of these products.

Preparation of Sample for Heat Stability and Dispersion Tests

A mixture consisting of 50 grams Red 60, 35 grams of lignin, 125 milliliters water and 5 drops of EDTA (1% solids at pH ~ 10.0 – 10.5) was pH adjusted to 8 with acetic or sulfuric acid. The dye composition was ground in a ball mill to the point where the filter test for disperse dyes was passed.

Dispersion Test

One gram of solids material was diluted to 10 milliliters with water and stirred for approximately 60 seconds to obtain a smooth paste. The paste is diluted immediately to a 250-milliliter volume and stirred for 1 minute. Then the mixture is filtered through a Buchner funnel containing a tared 9.0 cm. No. 2 and No. 4 Whatman filter paper (with vacuum) and rinsed with 300 milliliters water. Filtration time and filter residues are recorded. Well dispersed dyes with good filtration properties should filter completely in 60 seconds and should exhibit approximately equal staining of the No. 2 and No. 4 filter papers.

Heat Stability Test

To one gram of solid dye composition was added 250 milliliters of water, and the solution was boiled for 15 minutes and then filtered through a tared Whatman filter paper No. 2 (No. 4) (with vacuum). The time for the filtration was recorded. The filter paper was dried, and this residue dye material remaining on the filter was calculated.

Staining Test

Five grams of dispersant material (1:1 ratio of dispersant to fiber) were taken into 200 milliliters of water and pH adjusted to ~ 7.0 (4.0). After heating to boiling condition, a nylon skein was added and periodically turned for 15 minutes. The fiber is then removed, washed with tap water and dried.

Reflectance was recorded with an instrument (Model 610) from the Photovolt Corporation in New York. The machine should be allowed to warm up for at least three hours. Care should be practiced that the skein, during measurements, is stretched so that the individual strings are parallel to each other. For higher accuracy, each skein was aligned and measured five times. Then the average number was taken.

The practice of this invention may be better understood in the following examples:

EXAMPLE 1

This example illustrates the effect of epichlorohydrin blocking and cross-linking on a sulfomethylated lignin. Several samples, each containing 1,000 grams of 30% solution of a sulfomethylated alkali lignin, were pH adjusted to 10.5 – 10.7 using 50% sodium hydroxide. The solution was heated to 90° C. At this point, 0.5 mole, 1.0 mole, 1.5 moles and 2.0 moles of epichlorohydrin were introduced at vigorous stirring over a time period of 10–15 minutes. A temperature increase has been noticed of approximately 2° C.–5° C. The reaction was allowed to go to completion within 4 hours after epichlorohydrin addition at 95° C. Final solids content was 32%. Light reflectance results are shown in Table III.

TABLE III

FIBER STAINING

| Moles Epichlorohydrin per 1,000 Grams Lignin | Degree of Blocking | Staining of Blocked Lignins % Reflectance | |
|---|---|---|---|
| | | pH 4 | pH 7 |
| 0 | 0 | 65 | 80 |
| 0.25 | — | 74 | 90 |
| 0.50 | 12 | 77 | 92 |
| 0.75 | — | 81 | 94 |

TABLE III-continued

FIBER STAINING

| Moles Epichlorohydrin per 1,000 Grams Lignin | Degree of Blocking | Staining of Blocked Lignins % Reflectance | |
|---|---|---|---|
| | | pH 4 | pH 7 |
| 1.00 | 35 | 83 | 95+ |
| 1.5 | 40 | 86 | 96+ |
| 2.0 | 46 | 87 | 96 |

The increased light reflectance shows that epichlorohydrin effectively blocked the lignin samples.

EXAMPLE 2

1,000 grams of 30% sulfomethylated lignin solution was diluted to a solids content of 25% requiring 200 milliliters of water. After proper pH adjustments to 11.0 using 50% sodium hydroxide, the solution was heated to 90° C. At this point, 1.5 moles of epichlorohydrin were introduced at vigorous stirring over a time period of 20 minutes (dropping funnel). A temperature increase has been noticed of about 5° C.–7° C. The reaction was allowed to go to completion within 4 hours after epichlorohydrin completion after which the product was allowed to cool to room temperature. Final solids content was 28%. The products successfully passed the dispersion test, heat stability test and fiber staining test.

EXAMPLE 3

This example illustrates the effect of stabilization by oxidation with hydrogen peroxide on an epichlorohydrin/sulfonated lignin adduct. A sulfonated kraft lignin at 25% by weight lignin solids and pH 11.0 was reacted with 1.5 moles of epichlorohydrin at 85° C for 4 hours. After 24 hours storage, the sample was stabilized with hydrogen peroxide at 50° C. for 60 minutes. The results were effective and are shown in the table below.

TABLE IV

| Sample | Viscosity at 25° C. (cps.) |
|---|---|
| 1.5 moles initial | 360 |
| After 24 hours storage | 1,285 |
| Stabilized with 2 moles $H_2O_2$ after 24 hours storage | 40 |
| 5 days storage after $H_2O_2$ stabilization | 42.5 |

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. In a process for modifying a sulfonated lignin to provide dye dispersant properties by reacting a sulfonated lignin with an epihalohydrin the improvement commprising,
reacting an aqueous solution of a sulfonated lignin at a solids concentration between 5% and 35% with from 0.1 to 2.0 moles of an epihalohydrin per 1,000 grams of lignin at a temperature between 20° C. and 100° C. and a starting pH between 9 and 13 until the sulfonated lignin-epihalohydrin adduct has a viscosity below 500 cps. at 25° C.

2. The process according to claim 1 wherein said epihalohydrin is epichlorohydrin and the amount of epichlorohydrin is between 0.75 mole and 1.5 moles of epichlorohydrin per 1,000 grams of lignin.

3. The process according to claim 2 wherein the reaction pH is maintained between 10.5 and 12.5 and the temperature between 50° C. and 90° C.

4. The process according to claim 1 further comprising, stabilizing the sulfonated lignin-epihalohydrin adduct with an oxidant selected from the group consisting of air, oxygen and hydrogen peroxide.

5. In a process for modifying a sulfonated lignin to provide dye dispersant properties by reacting a sulfonated lignin with an epihalohydrin the improvement consisting essentially of;
a. reacting an aqueous solution of a sulfonated lignin at a solids concentration of between 5% and 35% with from 0.1 to 2.0 moles of an epihalohydrin per 1,000 grams of lignin at a temperature between 20° C. and 100° C. and a starting pH between 9 and 13 until the sulfonated lignin-epihalohydrin adduct has a viscosity below 500 cps. at 25° C., and
b. stabilizing said sulfonated lignin-epihalohydrin adduct with an oxidant selected from the group consisting of air, oxygen and hydrogen peroxide.

6. The process according to claim 5 wherein said epihalohydrin is epichlorohydrin and the amount of epichlorohydrin is between 0.75 mole and 1.5 moles of epichlorohydrin per 1,000 grams of lignin.

7. The process according to claim 5 wherein the reaction pH is maintained between 10.5 and 12.5 and the temperature between 50° C. and 90° C.

* * * * *